Sept. 20, 1966  R. C. DOW  3,274,474
CONTROLLED RECTIFIER SUPPLY FOR MOTOR SPEED SYSTEM
Filed Sept. 3, 1963
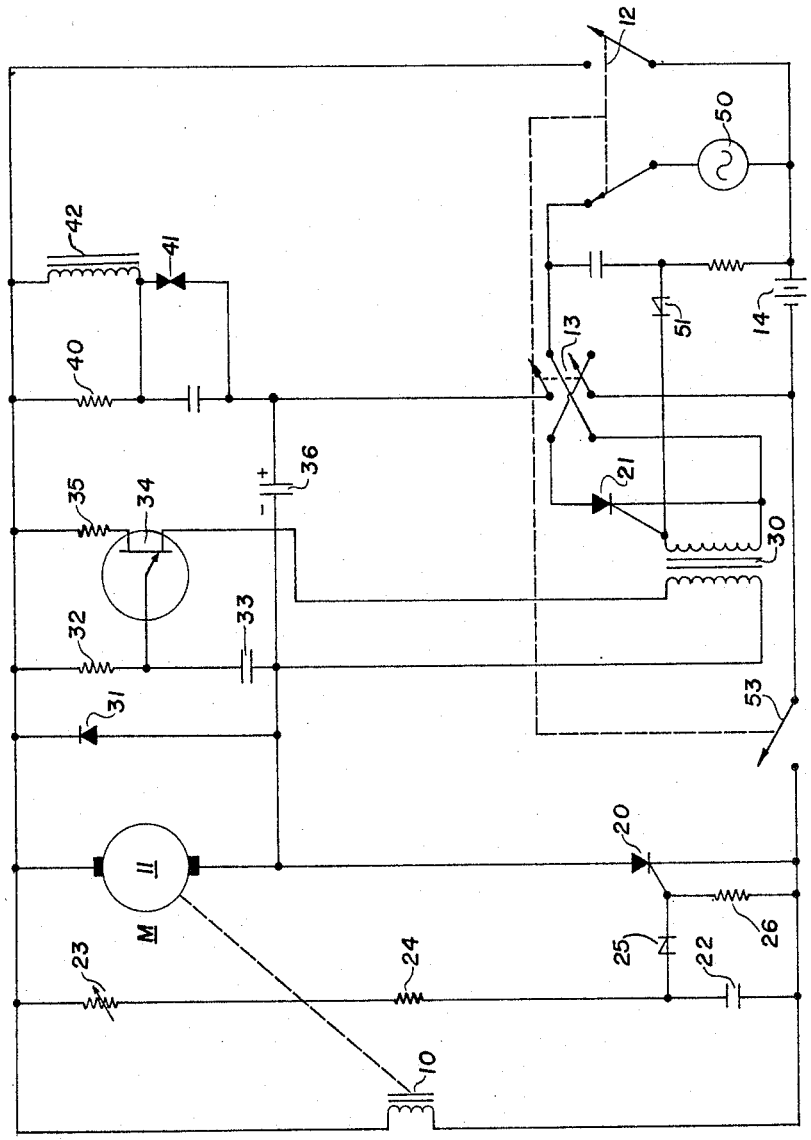
RONALD C. DOW
INVENTOR.
BY D. Carl Richards United States Patent Office 3,274,474
Patented Sept. 20, 1966

3,274,474
CONTROLLED RECTIFIER SUPPLY FOR MOTOR SPEED SYSTEM
Ronald C. Dow, Garland, Tex., assignor to Power Engineering, Inc., Richardson, Tex., a corporation of Texas
Filed Sept. 3, 1963, Ser. No. 305,956
4 Claims. (Cl. 318—332)

This invention relates to motor control systems and more particularly to control of a D.C. motor through the use of silicon controlled rectifiers. In a more specific aspect, the invention involves a turn-off rectifier having a supervisory time delay extinction circuit.

With the availability of control devices for direct current such as silicon controlled rectifiers, precision may be achieved in the control circuits such as in the control of the speed of variable speed drives powered by D.C. motors. However, it has been found that in the use of such controlled circuits, there are occasions when control is lost and the motor thus driven reaches excessive speed. The present invention provides for a positive control of a variable speed motor drive. The operation is such that any loss of control is immediately sensed and circuit modifications induced which re-establish control to permit continuous operation in a reliable manner.

In accordance with the invention, there is provided a speed control system for a motor in which a first controlled rectifier repeatedly is fired to permit current flow from a D.C. source through the motor armature. A second controlled rectifier is connected in circuit with the first controlled rectifier. Means responsive to current flow through the armature renders the second controlled rectifier conductive. Current interrupting means is provided in circuit with the second controlled rectifier. Delay means responsive to current flow exceeding a predetermined level through the second controlled rectifier momentarily opens the circuit from the source to said second controlled rectifier.

For a more complete understanding of the present invention and for further objects and advantages thereof, reference may now be had to the following description taken in conjunction with the accompanying drawing in which the figure is a schematic circuit diagram embodying the present invention.

In the figure, the speed of a motor M having a field winding 10 in an armature 11 is to be controlled. The system is operated normally with switch 12 closed and the double-pole, double-throw switch 13 in the left-hand position. Switches 12 and 13 are mechanically coupled together. In the operating position, battery 14 is connected directly across the field winding 10, maintaining excitation thereof.

The primary object of the invention is to control the current flow through the armature 11. Control of the armature current is accomplished through the use of two silicon controlled rectifiers 20 and 21. Rectifier 20 is turned on repeatedly and is turned off by the use of a circuit including the second silicon controlled rectifier 21.

The turn-on of rectifier 20 is accomplished by charging condenser 22 by way of variable resistor 23 and a fixed resistor 24. When condenser 22 reaches the voltage equal to the break-down voltage of an avalanche diode 25, it discharges through resistor 26 to fire the rectifier 20. Resistor 23 is variable to control the speed of the armature 11 by controlling the rate at which the condenser 22 is charged to the break-down potential of the diode 25.

Speed control can be exercised over a range which is adequate to cover the range of speeds desired for the motor armature 11.

The conduction through the rectifier 20 normally is limited to periods of very short duration, of the order of 10 milliseconds. The rate at which such pulses are caused to flow through the armature 11 is thus controlled by resistor 23. The flow of current is terminated by the discharge of condenser 36 through the rectifier 20. This discharge is effected by triggering rectifier 21 by way of transformer 30. The control pulse for application to transformer 30 is produced through the circuit connected across the armature 11. A first diode 31 is connected directly in parallel with armature 11 to serve as a clipping diode to avoid the loss of control of rectifier 20 by the production of random pulses in the armature 11. A second circuit connection across the armature 11 involves a resistor 32 and a condenser 33 which are connected in series. The condenser 33 is periodically charged to a voltage such that a uni-junction 34 is rendered conductive. A current pulse thus flows through resistance 35, the uni-junction 34, and transformer 30 to render rectifier 21 conductive.

When rectifier 21 is conductive it essentially forms a short circuit so that the positive electrode of condenser 36 is connected to the cathode of the rectifier 20. Thus the current flow through the rectifier 20 is extinguished.

It should be noted that condenser 36 is charged by way of resistor 40 and normally closed relay contacts 41.

In operating systems of the foregoing type, it sometimes has been found that control of the turn-off rectifier 21 sometimes is lost so that there is failure to extinguish current flow through the armature, thus causing the motor M to attain undesirable high speeds. In accordance with the present invention, positive control is provided for the turn-off rectifier 21 through means which will cause the circuit leading to the turn-off rectifier 21 to be opened when a predetermined condition exists in the control circuit. More particularly, if the rectifier 21 is not turned off through discharge therethrough of condenser 36, then the current flow through resistor 40 will attain such magnitude for a sufficient period of time as to energize the relay coil 42. When relay coil 42 is energized at a predetermined level, the contacts 41 will open, thereby extinguishing current flow through rectifier 21. At the same time, relay coil 42 becomes de-energized and the normal operation of the motor control circuit is then resumed. The provision of the relay contacts 41 and control thereof as above explained provides for fail-safe operation of the motor control system and permits accurate and reliable control of the speed of motor M.

The system also includes provision for charging battery 14 from an alternating current source 50. The charging circuit is effective when the switches 12 and 13 are in the right-hand position, as illustrated. In such position, the rectifier 21 is essentially inverted to provide charging current through the break-down of the diode 51. The battery 14 may thus be periodically recharged as may be desired.

Control of commutation of the type above described has heretofore been difficult, primarily because of the problem of maintaining positive control through the charging of the condenser 36. When difficulty is encountered, the rectifier 21 often will not turn off and communtation is lost. In the present system, the use of the circuit involving the relay coil 42, the resistance 40, and the contacts 41 causes the relay contacts 41 to be opened thereby turning off recifier 21 and permitting suceeding cycles to be undertaken. A switch 53 is mechanically coupled to switches 12 and 13. It is normally closed while running the motor and is opened during the charge cycle. This keeps the A.C. line potential from appearing across the field, resistor 40, and relay coil 42, during the periods when battery 14 is being charged.

From the foregoing, it will be seen that the present invention provides for retention of positive control of a polyspeed variable D.C. motor drive where silicon controlled rectifiers are employed in the armature control circuit. A first controller rectifier is rendered conductive at time intevals which are variable and are dependent upon an adjustable timing circuit for control of motor speed. Current flow through the armature is terminated a predetermined time interval after each initiation of current flow by actuation of a second controlled rectifier. A control element is provided which is responsive to excessive current flow through the second controlled rectifier for extinguishing the same, thereby to assure positive control of the armature current.

Having described the invention in connection with certain specific embodiments thereof, it is to be understood that further modifications may now suggest themselves to those skilled in the art and it is intended to cover such modifications as fall within the scope of the appended claims.

What is claimed is:

1. In a control system for a motor in which a first controlled rectifier repeatedly is fired to permit current flow fom a source through the motor armature, a combination which comprises:
    (a) a second controlled rectifier connected in circuit with said first controlled rectifier,
    (b) means responsive to current flow through said armature to render said second controlled rectifier conductive to extinguish said first controlled rectifier,
    (c) circuit means for interrupting current flow from said source to said second controlled rectifier, and
    (d) delay means responsive to current flow exceeding a predetermined amount through said second controlled rectifier for momentarily opening said circuit means.

2. A variable speed control for a D.C. motor having a constant field excitation which comprises:
    (a) a first controlled rectifier and a D.C. source in series with the armature of said motor,
    (b) adjustable means for periodically initiating conduction in said first controlled rectifier,
    (c) a second controlled rectifier and a mechanical switch connected in series with said source,
    (d) circuit means for interconnecting said first rectifier and said second rectifier in a local circuit in opposite polariy,
    (e) means for firing said second controlled rectifier a predetermined time interval after each initiation of current flow through said armature for flow of current in said local circuit to extinguish said first controlled rectifier, and
    (f) means for actuating said switch to open the circuit between said source and said second controlled rectifier when current therethrough reaches a predetermined condition.

3. A variable speed control for a D.C. motor having a constant field excitation which comprises:
    (a) a first controlled rectifier and a D.C. source in series with the armature of said motor,
    (b) timing means actuated from said source for periodically initiating conduction in said first controlled rectifier,
    (c) a condenser connected at one terminal to the juncture between said armature and said first controlled rectifier and at the other terminal to said source by way of a control element,
    (d) a second controlled rectifier connected to said second terminal of said condenser and to said source,
    (e) a control circuit for firing said second controlled rectifier a predetermined time interval after each initiation of current flow through said armature for discharging said condenser thereby extinguishing said first controlled rectifier, and
    (f) means for actuating said control element to open the circuit between said source and said second controlled rectifier when current therethrough reaches a predetermined condition.

4. A polyspeed variable motor drive from a unidirectional current source which comprises:
    (a) a first circuit including a field winding connected across said source,
    (b) a second circuit including a controlled rectifier in series with the armature of said motor connected across said source,
    (c) a third circuit connected across said source and to said first controlled rectifier and including timing means to render said rectifier conductive at time intervals dependent upon the setting of said timing means,
    (d) a fourth circuit connected across said source including a second controlled rectifier poled the same as said first controlled rectifier and connected in series with a pair of normally closed relay contacts and a resistor,
    (e) a condenser connected at one terminal to the juncture between the first controlled rectifier and said armature and at the other terminal to the juncture between the second controlled rectifier and said normally closed contacts,
    (f) a timing circuit connected across said armature and responsive to current flow through said armature for firing said second controlled rectifier a predetermined time interval after each initiation of current flow through said armature, and
    (g) energizing means for said normally closed contacts responsive to current flow through said second controlled rectifier of a predetermined condition for opening said normally closed contacts to terminate control of current flow through said second controlled rectifier.

References Cited by the Examiner
UNITED STATES PATENTS
3,150,307  9/1964  Kaeding _____ 318—345

ORIS L. RADER, *Primary Examiner.*

S. GORDON, J. C. BERENZWEIG, *Assistant Examiners.*